United States Patent
Brew et al.

(10) Patent No.: US 11,047,049 B2
(45) Date of Patent: Jun. 29, 2021

(54) LOW TEMPERATURE METHOD OF FORMING LAYERED HT-LICOO$_2$

(71) Applicant: International Business Machines Corporation, Armonk, NY (US)

(72) Inventors: Kevin W. Brew, Albany, NY (US); Saurabh Singh, Yonkers, NY (US); Teodor K. Todorov, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/631,723

(22) Filed: Jun. 23, 2017

(65) Prior Publication Data

US 2018/0371617 A1 Dec. 27, 2018

(51) Int. Cl.
*C23C 18/00* (2006.01)
*C23C 18/12* (2006.01)
*H01M 4/04* (2006.01)
*H01M 4/525* (2010.01)
*B01J 23/78* (2006.01)
*H01M 10/0562* (2010.01)
(Continued)

(52) U.S. Cl.
CPC .......... *C23C 18/1216* (2013.01); *B01J 23/78* (2013.01); *C23C 18/1254* (2013.01); *H01M 4/0428* (2013.01); *H01M 4/131* (2013.01); *H01M 4/1391* (2013.01); *H01M 4/525* (2013.01); *H01M 10/0525* (2013.01); *H01M 10/0562* (2013.01); *C23C 18/1283* (2013.01); *H01M 2300/0071* (2013.01)

(58) Field of Classification Search
CPC ................................. C23C 18/00; H01M 4/00
See application file for complete search history.

(56) References Cited

U.S. PATENT DOCUMENTS 5,538,814 A * 7/1996 Kamauchi ............. H01M 4/131
429/231.8
7,510,582 B2 3/2009 Krasnov et al.
(Continued)

OTHER PUBLICATIONS

Yoon et al., "Influence of Two-Step Heat Treatment on Sputtered Lithium Cobalt Oxide Thin Films", Journal of Electrochemical Society, vol. 158, No. 12, (2011), pp. A1313-A1319.*
(Continued)

*Primary Examiner* — David P Turocy
*Assistant Examiner* — Mohammad Mayy
(74) *Attorney, Agent, or Firm* — Randall Bluestone; Michael J. Chang, LLC (57) ABSTRACT

Low temperature techniques for forming layered lithium cobalt oxide (LCO) are provided. In one aspect, a method of synthesizing layered LCO includes: forming a metal catalyst layer (e.g., platinum) on a substrate; depositing LCO onto the metal catalyst layer; and annealing the LCO under conditions sufficient to form the layered LCO on the metal catalyst layer. An adhesion layer can be deposited on the substrate, and the metal catalyst layer can be deposited onto the adhesion layer. In another aspect, a structure is provided including: a substrate; a metal catalyst layer (e.g., platinum) disposed on the substrate; and layered LCO formed on the metal catalyst layer. An adhesion layer can be disposed between the substrate and the metal catalyst layer.

12 Claims, 9 Drawing Sheets

(51) Int. Cl.
H01M 10/0525 (2010.01)
H01M 4/131 (2010.01)
H01M 4/1391 (2010.01)

(56) References Cited

U.S. PATENT DOCUMENTS

| | | | |
|---|---|---|---|
| 7,959,769 | B2 | 6/2011 | Zhang et al. |
| 8,870,974 | B2 | 10/2014 | Nieh et al. |
| 2002/0164522 | A1* | 11/2002 | Huang ................ H01M 8/0215 429/478 |
| 2008/0213664 | A1* | 9/2008 | Krasnov ............. H01M 4/0426 429/220 |
| 2009/0092903 | A1* | 4/2009 | Johnson .............. H01M 4/0471 429/322 |
| 2011/0310530 | A1* | 12/2011 | Laor .................... B01J 37/0238 361/524 |
| 2014/0011085 | A1* | 1/2014 | Fujdala ................. C01D 15/02 429/211 |
| 2014/0030449 | A1 | 1/2014 | Song et al. |
| 2014/0294720 | A1* | 10/2014 | Noguchi ................ C01D 15/02 423/594.6 |
| 2016/0211517 | A1* | 7/2016 | Beck ...................... H01M 4/525 |
| 2017/0149093 | A1* | 5/2017 | Sun ................... H01M 10/0585 |

OTHER PUBLICATIONS

"Fabrication of LiCoO2 thin films by sol-gel method and characterisation as positive electrodes for Li/LiCoO2 cells" Mun-Kyu Kim, Hoon-Taek Chung, Yong-Joon Park, Jin-Gyun Kim, Jong-Tae, SonaKyu-Sung, Park Ho-Gi Kim, Journal of Power Sources vol. 99, Issues 1-2, Aug. 2001, pp. 34-40. (Year: 2001).*

Nitrogen, Airgas, MSDS (Year: 2003).*

Fuller et al., "Li-Ion Synaptic Transistor for Low Power Analog Computing," Adv. Mater. 2017, 29, 1604310 (8 pages) (published Nov. 2016).

Yang et al., "Memristive Devices for Computing: Mechanisms, Applications and Challenges," USLI Process Integration 8 at the 224th Electrochemical Society Meeting (Oct. 27-Nov. 1, 2013) (7 pages).

Nitta et al., "Li-ion battery materials: present and future," Materials Today, vol. 18, No. 5, pp. 252-263 (Jun. 2015).

Julien et al., "Comparative Issues of Cathode Materials for Li-Ion Batteries," Inorganics Mar. 2014, 2, pp. 132-154.

Goriparti et al., "Review on recent progress of nanostructured anode materials for Li-ion batteries," Journal of Power Sources, 257, pp. 421-443 (Jan. 2014).

R.J. Gummow, et al., "Spinel versus layered structures for lithium cobalt oxide synthesised at 400° C.," Mater. Res. Bull., vol. 28, No. 3, pp. 235-246, Mar. 1993.

V G Hadjiev et al., "The Raman spectra of Co3O4," J. Phys. C: Solid State Phys., vol. 21, No. 7, pp. L199-L201, Mar. 1988.

H. Porthault et al., "Raman study of the spinel-to-layered phase transformation in sol-gel LiCoO2 cathode powders as a function of the post-annealing temperature," Vib. Spectrosc., vol. 62, pp. 152-158, Sep. 2012 (Abstract) (3 pages).

* cited by examiner

LOW TEMPERATURE METHOD OF FORMING LAYERED HT-LICOO₂

FIELD OF THE INVENTION

The present invention relates to lithium cobalt oxide (LCO) synthesis and more particularly, to low temperature techniques for forming layered LCO using a platinum catalyst.

BACKGROUND OF THE INVENTION

Lithium cobalt oxide, LCO ($Li_xCoO_2$) is a commonly used material for an electrochemical cathode. LCO has also been recently implemented for memristive devices. See, for example, Fuller et al., "Li-Ion Synaptic Transistor for Low Power Analog Computing," Adv. Mater. 2017, 29, 1604310 (8 pages) (published November 2016). Memristive devices are electrical switches that can alter their state of internal resistance based on an applied voltage and current. See, for example, Yang et al., "Memristive Devices for Computing: Mechanisms, Applications and Challenges," USLI Process Integration 8 at the 224th Electrochemical Society Meeting (Oct. 27-Nov. 1, 2013) (7 pages). Memristive devices have gained significant interest for accelerated machine learning applications.

LCO has 2 phases—the spinel Fd3m low temperature phase (LT LCO—synthesized at temperatures around 400° C.) and the layered R-3m high temperature phase (HT LCO—synthesized at temperatures around 800° C.). The layered phase is highly desired for electrochemical applications.

However, the fabrication of micro-scale memristive devices and batteries requires lower processing temperatures for compatibility with other circuit elements. As such, the use of layered HT LCO for these applications presents a challenge.

Therefore, fabrication techniques that enable use of layered HT LCO in high temperature-sensitive devices such as micro-scale memristive devices and batteries would be desirable.

SUMMARY OF THE INVENTION

The present invention provides low temperature techniques for forming layered lithium cobalt oxide (LCO) using a catalyst. In one aspect of the invention, a method of synthesizing layered HT phase LCO is provided. The method includes: forming a metal catalyst layer (e.g., platinum) on a substrate; depositing LCO onto the metal catalyst layer; and annealing the LCO under conditions sufficient to form the layered HT phase LCO on the metal catalyst layer. An adhesion layer can be deposited on the substrate, and the metal catalyst layer can be deposited onto the adhesion layer.

In another aspect of the invention, a structure is provided including: a substrate; a metal catalyst layer (e.g., platinum) disposed on the substrate; and layered HT phase LCO formed on the metal catalyst layer. An adhesion layer can be disposed between the substrate and the metal catalyst layer.

A more complete understanding of the present invention, as well as further features and advantages of the present invention, will be obtained by reference to the following detailed description and drawings.

DETAILED DESCRIPTION OF PREFERRED EMBODIMENTS

As provided above, the layered R-3m high temperature phase of lithium cobalt oxide, LCO ($Li_xCoO_2$) is desirable for electrochemical applications. However, the typical high processing temperatures for synthesizing layered HT LCO (about 800° C.) makes it incompatible with other components used in the fabrication of devices such as micro-scale memristive devices and batteries.

Advantageously, it has been found herein that a metal catalyst can be used in the formation of layered HT LCO which reduces the synthesis temperatures by from about 200° C. to about 300° C., and ranges therebetween. Thus, as compared to conventional processes employing temperatures as high as about 800° C. to synthesize HT LCO, a reduction down to as much as 500° C. can be realized with the present process.

As will be described in detail below, a preferred metal catalyst used in accordance with the present techniques is platinum (Pt). As also will be described in detail below, the metal catalyst layer can serve as the basis for depositing one or more HT LCO layers, with an intermediate anneal performed in between layers, and a final anneal performed after the final layer has been deposited. The HT LCO can be deposited from solution, by evaporation, etc.

Figure 1:
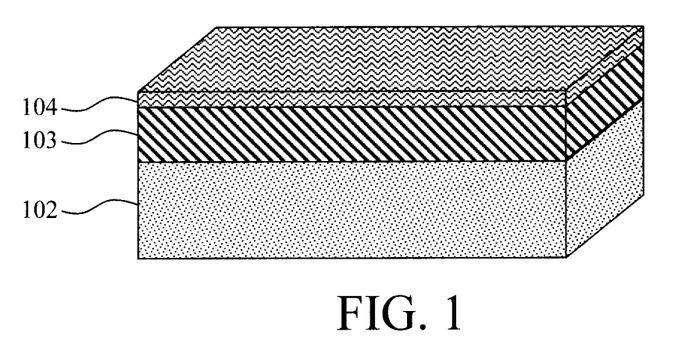
FIG. 1 is a diagram illustrating a substrate, an optional diffusion barrier layer having been formed on the substrate, and an optional adhesion layer having been formed on the diffusion barrier layer according to an embodiment of the present invention.

An exemplary implementation of the present techniques for synthesizing layered HT phase LCO is now described by way of reference to FIGS. 1-9. As shown in FIG. 1, the process begins with a substrate 102 onto which the HT LCO is to be formed. A variety of different substrates can be implemented depending on the particular application at hand. By way of example only, the substrate 102 can include, but is not limited to, glass, semiconductor (e.g., silicon), metal, etc. substrates. For instance, in an exemplary embodiment, the present techniques are implemented in the formation of a battery, and the substrate includes suitable electrical contact material such as a metal foil. Further, the substrate 102 shown in FIG. 1 may generically represent one or multiple layers, such as a substrate material in combination with a contact material.

As shown in FIG. 1, prior to placing the metal catalyst, FIT LCO, etc. it is preferable to deposit a diffusion barrier layer 103 on the substrate 102 and/or an adhesion layer 104 on the substrate 102. Placing a diffusion barrier layer 103 on the substrate 102 helps to prevent unwanted diffusion of substrate constituents up through the stack, e.g., during the subsequent anneal—see below. For instance, when the substrate 102 is formed from a semiconductor such as silicon (Si), the presence of a diffusion barrier layer 103 serves to prevent formation of platinum silicide from substrate Si as well as contamination of LCO layer with Si. According to an exemplary embodiment, the diffusion barrier layer 103 is formed from an oxide material such as silicon oxide ($SiO_2$) and/or aluminum oxide ($Al_2O_3$) deposited onto the substrate 102 using a process such as chemical vapor deposition (CVD) or atomic layer deposition (ALD) or, for example, in the case of an $SiO_2$ diffusion barrier layer, grown as a thermal oxide on a Si substrate. According to an exemplary embodiment, the diffusion barrier layer 103 is formed having a thickness of from about 50 nanometers (nm) to about 100 nm, and ranges therebetween (e.g., about 100 nm).

Next, an (optional) adhesion layer 104 is formed on the diffusion barrier layer 103, if present, or directly on the substrate 102. This will aid in achieving uniform coverage of the metal catalyst on the substrate 102. According to an exemplary embodiment, the adhesion layer 104 is formed from a metallic binder such as a layer of chromium, nickel, and/or titanium. Without the adhesion layer 104, the metal catalyst tends to form into islands rather than a uniform layer (unless the catalyst layer is made thick enough to achieve uniform coverage). According to an exemplary embodiment, the adhesion layer 104 is formed on the substrate 102 using a process such as evaporation, electrochemical plating, etc. as a thin film having a thickness of from about 5 nanometers to about 10 nm, and ranges therebetween (e.g., about 10 nm).

While beneficial, the diffusion barrier layer 103 and/or the adhesion layer 104 are optional features. Thus, embodiments are contemplated herein where either, or both, the diffusion barrier layer 103 and the adhesion layer 104 are not present. Namely, structures including, but not limited to, i) substrate 102/diffusion barrier layer 103/adhesion layer 104/metal catalyst 202 (see FIG. 2), ii) substrate 102/diffusion barrier layer 103/metal catalyst 202, iii) substrate 102/adhesion layer 104/metal catalyst 202, or simply iv) substrate 102/metal catalyst 202 are all anticipated in accordance with the present techniques.

The metal catalyst 202 is then formed on the substrate 102 (or on the optional diffusion barrier layer 103 and/or adhesion layer 104 if present). See FIG. 2. According to an exemplary embodiment, the metal catalyst 202 is formed from a layer of platinum deposited onto the substrate 102, diffusion barrier layer 103, or adhesion layer 104 using a process such as evaporation, electrochemical plating, etc. having a thickness of from about 50 nm to about 100 nm, and ranges therebetween (e.g., about 100 nm).

Figure 3:
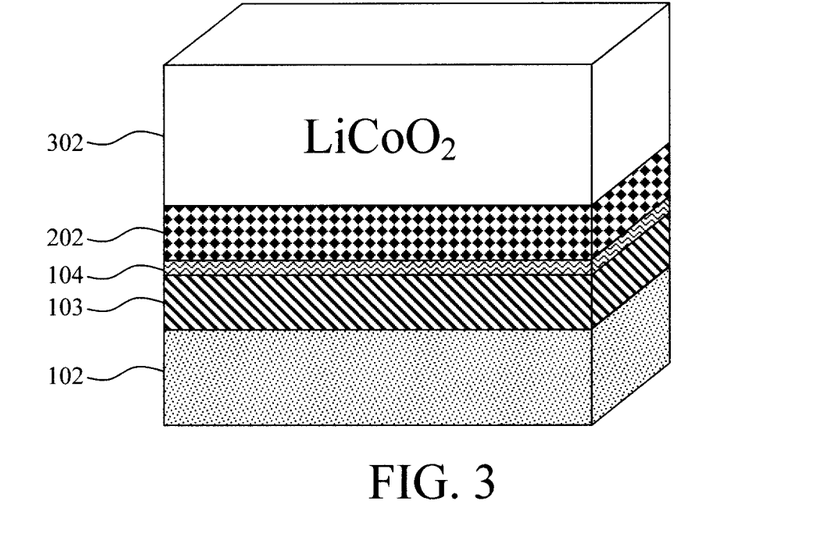
FIG. 3 is a diagram illustrating lithium cobalt oxide (LCO) having been deposited on the metal catalyst according to an embodiment of the present invention.

As shown in FIG. 3, LCO 302 is next deposited on the metal catalyst 202. According to an exemplary embodiment, the LCO 302 is deposited using a solution-based process (such as a Sol-Gel process) or evaporation.

An anneal of the LCO 302 is next performed under conditions (e.g., temperature, duration, etc.) sufficient to form layered high-temperature (HT) phase LCO (now given reference numeral 302a) on the metal catalyst 202. See FIG. 4. Advantageously however, due to the presence of the metal catalyst 202, the layered HT LCO phase will form at significantly lower temperatures as compared to conventional processes. For instance, according to an exemplary embodiment, the temperature used in synthesis of the present layered HT LCO is from about 500° C. to about 600° C., and ranges therebetween (e.g., about 500° C.) for a duration of less than or equal to about 30 minutes, for example, from about 15 minutes to about 30 minutes, and ranges therebetween. By comparison, conventional processes involve temperatures at or exceeding 800° C. synthesize layered HT LCO. Temperatures as high as 800° C. can cause damage to sensitive device components and circuitry often used in micro-batteries and memristive devices. Back end of line (BEOL) compatibility is a standard set of conditions in micro-device fabrication, and temperatures of 800° C. used to make an LCO layer would destroy back line circuitry.

According to an exemplary embodiment, the anneal is performed ex-situ, i.e., post deposition of the LCO precursor (e.g., LCO 302, LCO 602 (see below), etc.). This deposition and ex-situ anneal to form HT LCO enables solution processing as described above.

It is notable that the process generally outlined in FIGS. 1-4 can be implemented in an iterative manner to form multiple layers of HT LCO. This process will be described in detail below. In general however, an intermediate (lower temperature) anneal is performed after the deposition of each layer of LCO, followed by a final anneal (using the conditions specified above in accordance with FIG. 4) after all LCO layers have been deposited.

Forming multiple layers of the layered HT phase LCO can be used to achieve a desired final thickness of the material on the substrate 102. For instance depending on the desired final thickness of the layered HT phase LCO, with solution processing it may not be possible to apply enough LCO solution to the substrate in a single step. Thus, one can simply perform multiple deposition and annealing iterations to achieve the desired final thickness.

Figure 2:
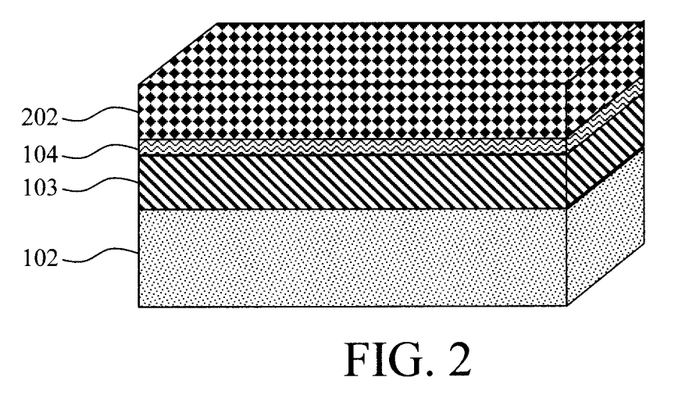
FIG. 2 is a diagram illustrating a metal catalyst having been formed on the substrate (or on the optional diffusion barrier layer or adhesion layer) according to an embodiment of the present invention.
Figure 5:
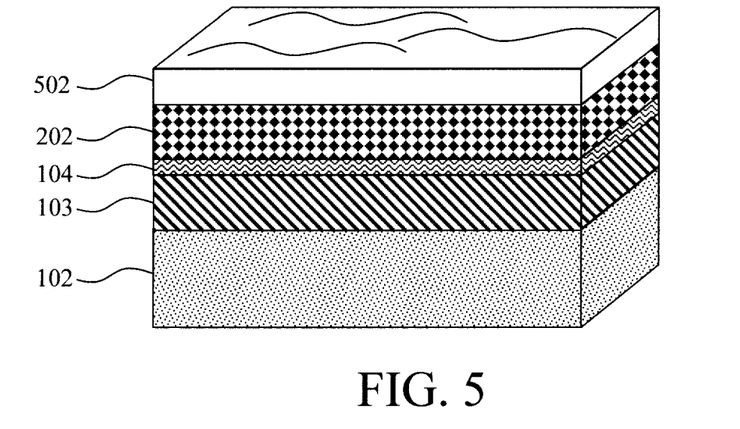
FIG. 5 is a diagram illustrating a substrate, an adhesion layer having been formed on the substrate, a metal catalyst having been formed on the adhesion layer, and an LCO solution having been cast onto the metal catalyst according to an embodiment of the present invention.
Figure 6:
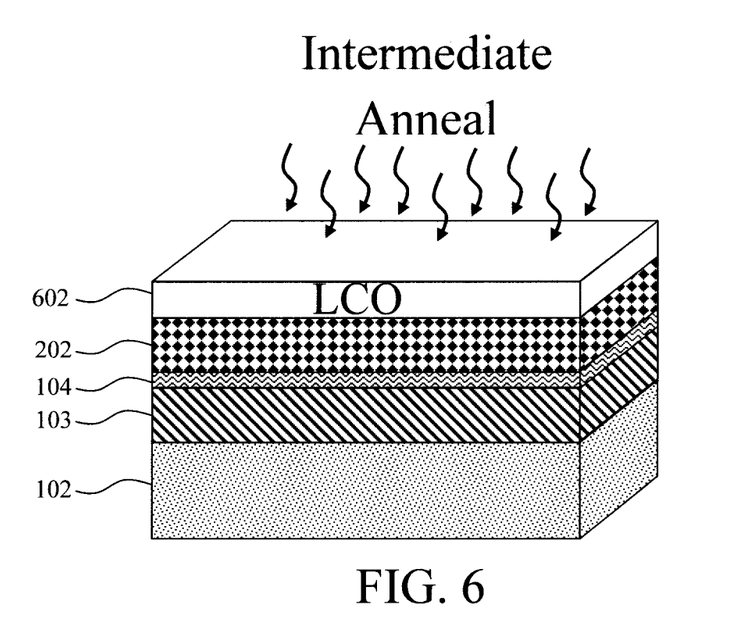
FIG. 6 is a diagram illustrating an intermediate anneal having been performed to form a first LCO layer on the metal catalyst according to an embodiment of the present invention.

For instance, as shown in FIG. 5, the process outlined above according to FIGS. 1-3 may be performed to form the adhesion layer 104 on the substrate 102, and the metal catalyst 202 on the adhesion layer 104. In this example, a solution-based process, such as Sol-Gel, is used to deposit the LCO onto the metal catalyst 202. As is known in the art, the Sol-Gel process involves a solid/liquid mixture (in this case LCO particles dissolved in a solvent to form a solution 502). The solution 502 is then cast onto the metal catalyst 202 followed, as shown in FIG. 6, by an intermediate anneal under conditions (temperature, duration, etc.) sufficient to form a (first) layer of LCO 602 on the metal catalyst 202. The intermediate anneal serves to drive off the solvent from solution 502 leaving behind LCO 602 onto which one or more additional (i.e., second, third, etc.) LCO layers can be deposited. According to an exemplary embodiment, the conditions include a temperature of from about 200° C. to about 500° C., and ranges therebetween (e.g., about 300° C.) for a duration of from about 1 minute to about 25 minutes, and ranges therebetween (e.g., for about 1 minute).

Figure 4:
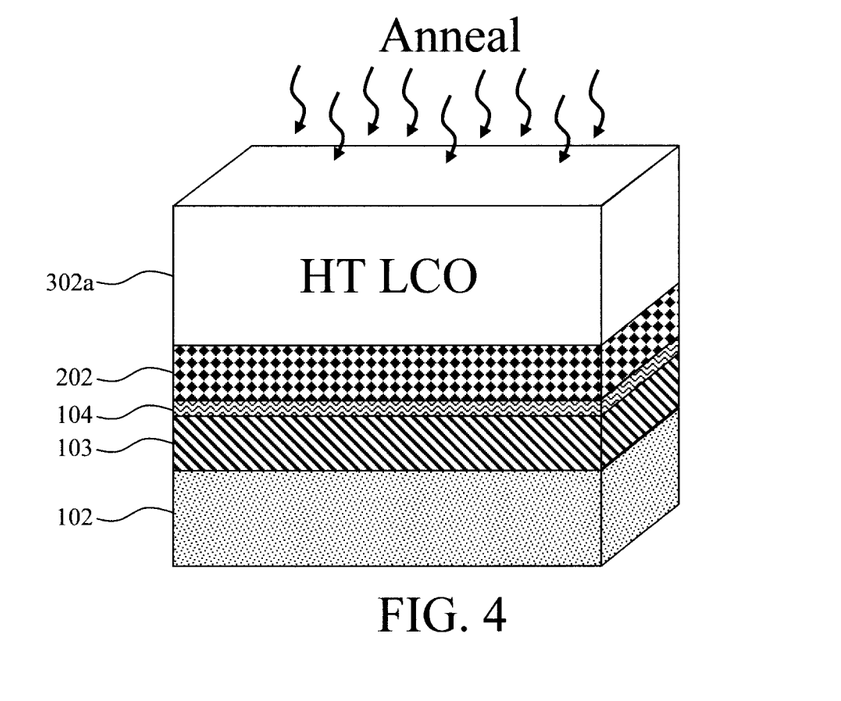
FIG. 4 is a diagram illustrating an anneal of the LCO having been performed to form high-temperature (HT) phase LCO according to an embodiment of the present invention.

For illustrative purposes only, the LCO 602 is shown in FIG. 6 to be thinner than the final desired thickness achieved for example as shown in FIG. 4. This is done merely to illustrate how the layer can be built up by multiple LCO depositions. For ease and clarity of description, the LCO layers deposited in each iteration may also be referred to herein as first, second, etc. LCO layers. Further, as provided above the adhesion layer 104 is an optional feature.

The process can then be iterated n times to add an additional second, third, etc. layer of LCO onto the first. For illustrative purposes only, one other iteration is depicted in the figures. However, multiple additional layers of LCO can be deposited in the same manner, if so desired.

Figure 7:
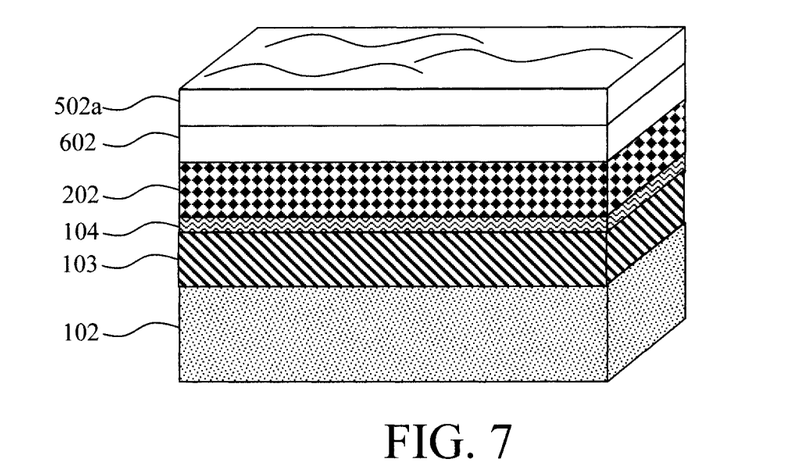
FIG. 7 is a diagram illustrating the LCO solution having been cast onto the first LCO layer according to an embodiment of the present invention.
Figure 8:
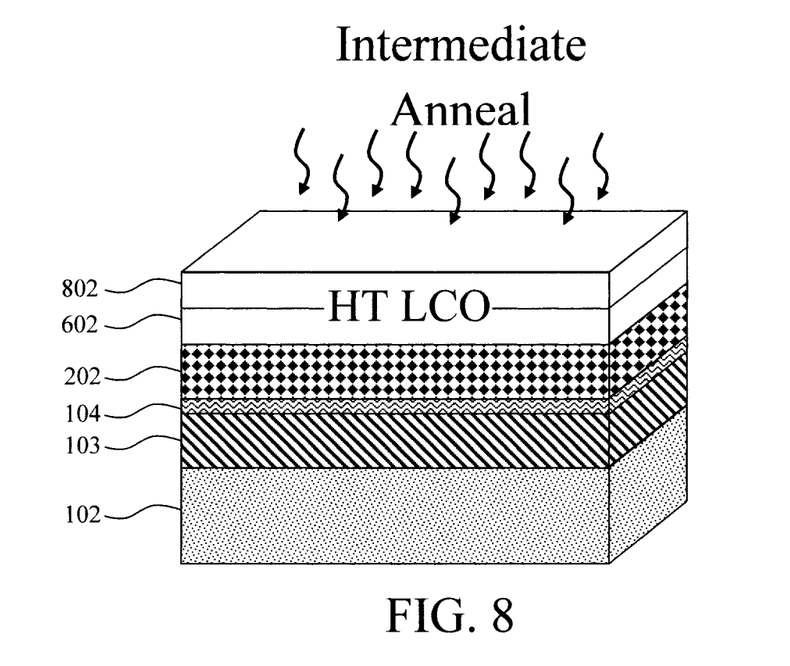
FIG. 8 is a diagram illustrating an intermediate anneal having been performed to form a second LCO layer on the first LCO layer according to an embodiment of the present invention.
Figure 9:
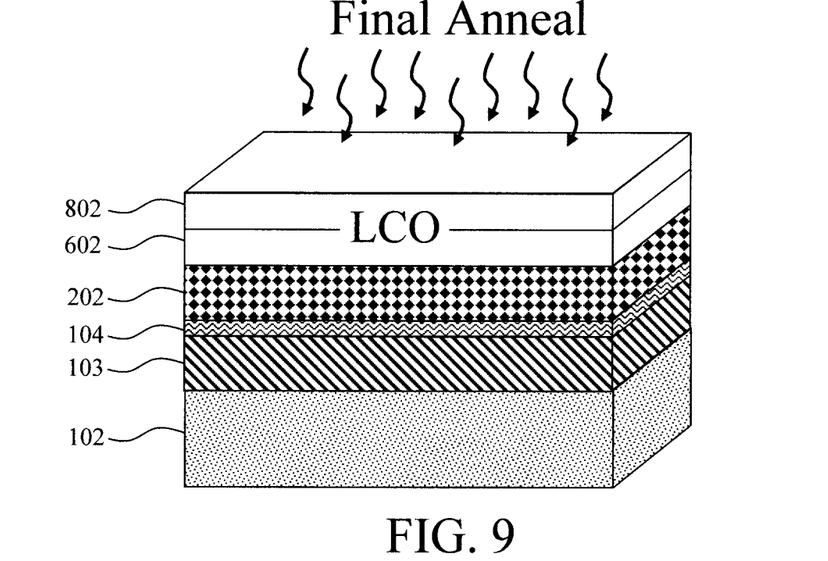
FIG. 9 is a diagram illustrating a final anneal having been performed to form layered high-temperature (HT) phase LCO according to an embodiment of the present invention.

For instance, as shown in FIG. 7 another layer of the LCO solution 502a is cast onto the LCO 602 followed, as shown in FIG. 8, by an intermediate anneal under conditions (temperature, duration, etc.) sufficient to form a (second) layer of LCO 802 on the (first) layer of LCO 602. Suitable conditions for this intermediate anneal were provided above.

Once the desired LCO layer thickness has been achieved by the multiple depositions/intermediate anneals, a final anneal of the LCO 602, 802, etc. is performed under conditions (e.g., temperature, duration, etc.) sufficient to form layered high-temperature (HT) phase LCO. See FIG. 9. Suitable conditions for this final anneal were provided in conjunction with the description of FIG. 4, above. While the final anneal employs higher temperatures than the intermediate anneal(s), they are still significantly lower than conventional processes. As described above, the present lower synthesis temperatures are possible due to the presence of the metal catalyst 202.

The crystal structure of layered HT phase LCO contains cobalt and lithium, located in octahedral sites, which occupy alternating layers and which form a hexagonal symmetry. See, for example, Nitta et al., "Li-ion battery materials: present and future," Materials Today, Volume 18, No. 5, pgs. 252-263 (June 2015) (e.g., FIG. 4(a) and accompanying text), the contents of which are incorporated by reference as if fully set forth herein. See, also, Julien et al., "Comparative Issues of Cathode Materials for Li-Ion Batteries," Inorganics March 2014, 2, pgs. 132-154, the contents of which are incorporated by reference as if fully set forth herein. As highlighted above, layered HT phase LCO is a highly desirable material for a variety of different electrochemical applications.

By way of example only, the present layered HT phase LCO may be used in a lithium ion battery stack. In general, a lithium ion battery includes an anode and a cathode separated by an electrolyte. In this example, the layered HT phase LCO formed using the above-described instant process may be used as the cathode material in the battery stack. See, for example, FIG. 10. Specifically, following formation of the layered HT phase LCO 302a (as described, for example, in accordance with the description of FIGS. 1-4, above), an electrolyte 1002 is deposited onto the layered HT phase LCO 302a, followed by an anode 1004.

Figure 10:
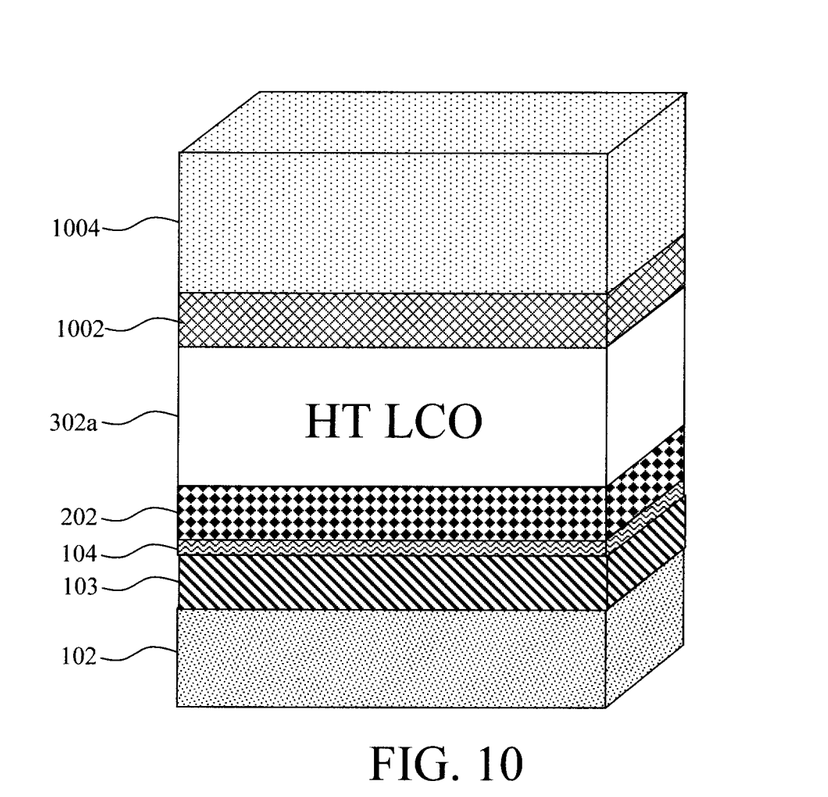
FIG. 10 is a diagram illustrating an exemplary lithium ion battery incorporating the present layered HT phase LCO according to an embodiment of the present invention.

According to an exemplary embodiment, a solid electrolyte 1002 is employed, such as amorphous lithium lanthanum titanate ($LiLaTiO_3$). The electrolyte acts as an electron barrier but permits lithium ions to diffuse therethrough as the battery is charged/discharged.

Suitable materials for the anode 1004 include, but are not limited to, vanadium oxide, graphite, carbon nanotubes, carbon nanofibers, silicon, germanium, tin, nickel, and/or transition metal oxides such as lithium oxide and titanium oxide, etc. See, for example, Goriparti et al., "Review on recent progress of nanostructured anode materials for Li-ion batteries," Journal of Power Sources," 257, pgs. 421-443 (January 2014), the contents of which are incorporated by reference as if fully set forth herein.

The battery depicted in FIG. 10 represents only one of a variety of different devices into which the present layered HT phase LCO process can be implemented. For instance, as provided above, layered HT phase LCO is a desirable material for memristive devices. See, for example, U.S. patent application Ser. No. 15/630,681, by Brew et al., entitled "Memristive Device Based on Reversible Intercalated Ion Transfer Between Two Meta-Stable Phases," the contents of which are incorporated by reference as if fully set forth herein.

The present techniques are further described by way of reference to the following non-limiting examples. Samples were prepared in accordance with the present techniques and a solution-based process for the LCO whereby 40% molar excess of lithium ethoxide was added to 5% weight by volume (w/v) cobalt(II) 2-methoxyethoxide in (solvent) methoxyethanol and stirred for 2 hours until dissolved forming an LCO solution.

The solution was drawn in an air free environment (such as a glove box filled with inert nitrogen gas—preferably below 1 part per million (ppm) $H_2O$ and 1 ppm $O_2$) and cast onto platinum catalyst-coated silicon substrates with an adhesion layer therebetween—as proscribed above. In this example, the adhesion layer consisted of a chromium film having a thickness of about 10 nm. The platinum catalyst had a thickness of about 100 nm.

An intermediate anneal of the samples was then performed at temperatures ranging from about 200° C. to about 500° C. (see below) for a duration of about 1 minute. A second layer of LCO layer was coated on the first layer (as proscribed above) and an intermediate anneal of the samples was again performed at temperatures ranging from about 200° C. to about 500° C. for a duration of about 1 minute to about 25 minutes.

A final anneal of the samples was then performed as proscribed above, and the samples were analyzed. In this example, the final anneal was performed at 500° C. for a duration of about 1 hour to about 10 hours, with a ramp-up rate of from about 1° C./minute to about 10° C./minute. The samples were analyzed via Raman spectra acquired with a 532 nm laser using 100× confocal lens for focus. ND 2.0 was used to prevent photobleaching of the sample. An analysis of the results is now provided.

Figure 11:
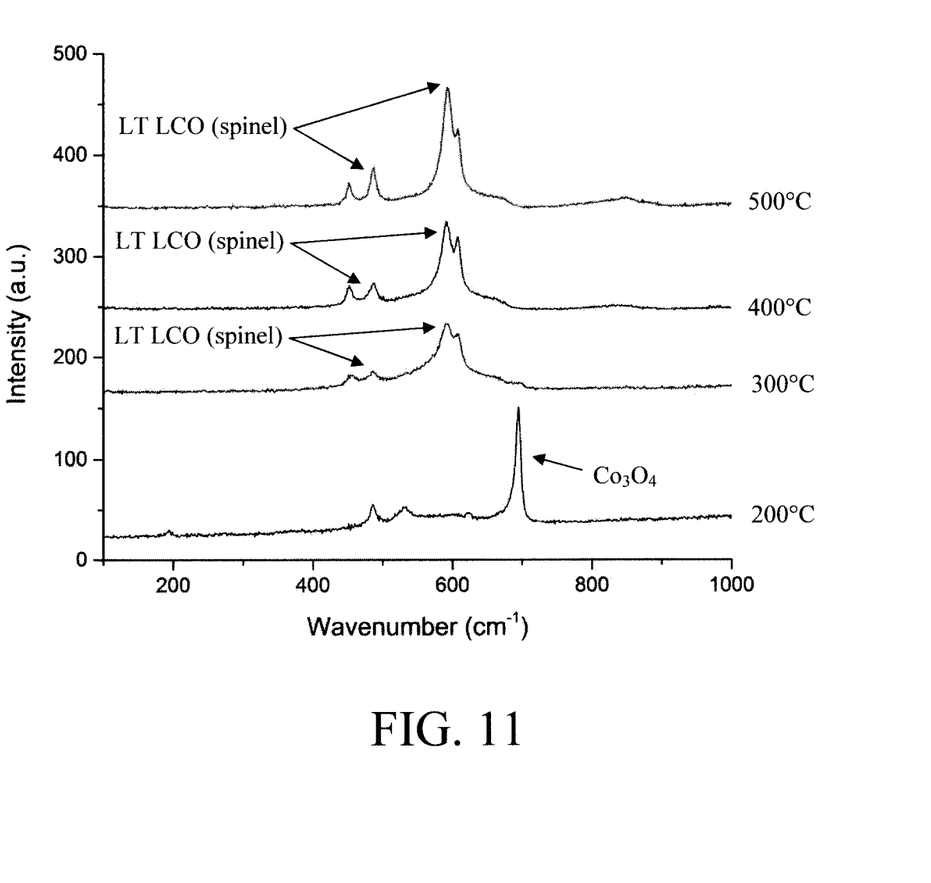
FIG. 11 is a spectra of samples with the $LiCoO_2$ solution coated on the platinum catalyst treated with varying intermediate anneal temperatures according to an embodiment of the present invention.

FIG. 11 is a Raman spectra of the samples with the $LiCoO_2$ solution coated on the platinum catalyst having been treated with varying intermediate anneal temperatures, i.e., 200° C., 300° C., 400° C., and 500° C. As shown in FIG. 11, the spinel low temperature (LT) phase LCO is formed in the 300° C., 400° C., and 500° C. samples. At 200° C., the temperature is so low that only $Co_3O_4$ appears.

Figure 12:
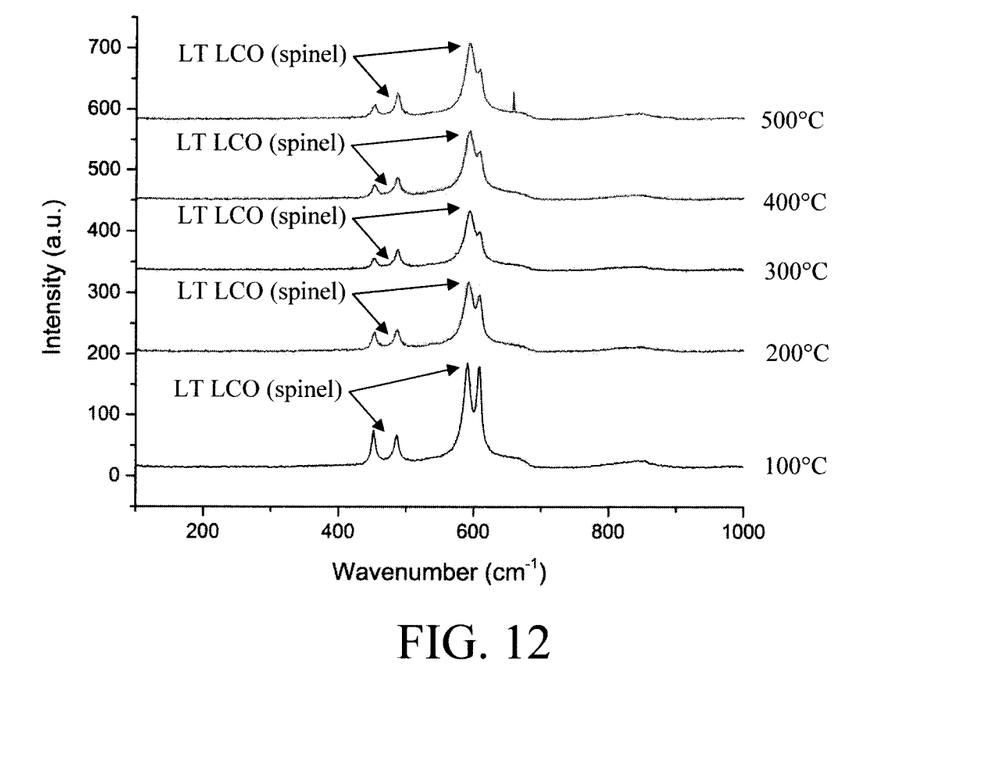
FIG. 12 is a spectra of a group of the samples being treated to a final anneal at a lower temperature of about 400° C. according to an embodiment of the present invention.

As a point of comparison, one group of samples was treated to a final anneal at a lower temperature of about 400° C. (for a duration of about 1 hour to about 10 hours, with a ramp-up rate of from about 1° C./minute to about 10° C./minute). See FIG. 12. As shown in FIG. 12, this resulted in synthesis of the spinel LT phase LCO in each of the samples in this group.

Figure 13:
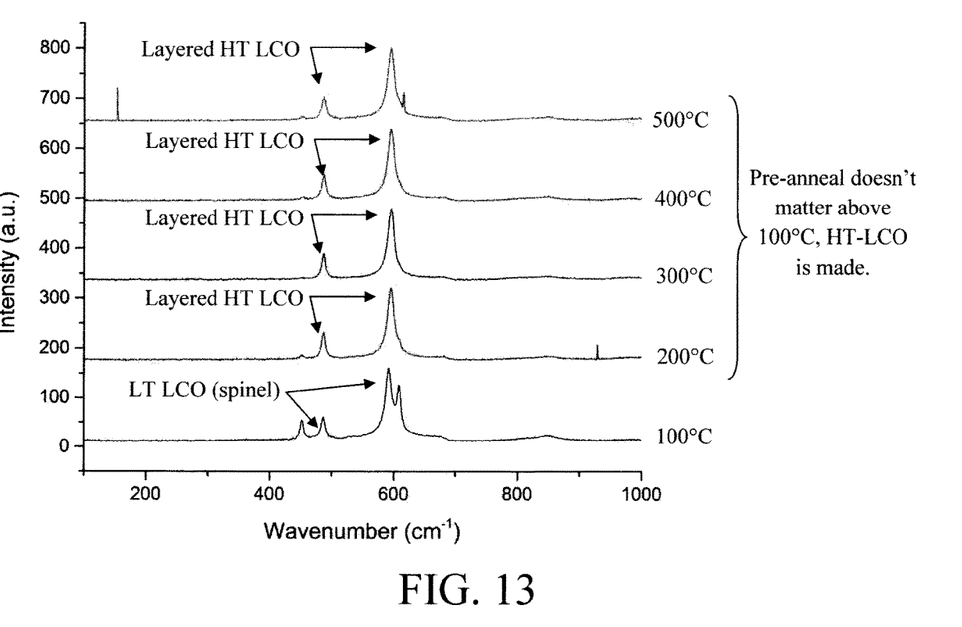
FIG. 13 is a spectra of another group of the samples being treated to a final anneal at a temperature of about 500° C. according to an embodiment of the present invention.

However, a final anneal of the samples at about 500° C. (for a duration of about 1 hour to about 10 hours, with a ramp-up rate of from about 1° C./minute to about 10° C./minute) resulted in the formation of layered HT phase LCO. See FIG. 13. Further, as shown in FIG. 13 layered HT phase LCO formation does not depend on the specific temperature at which the intermediate anneal(s) is performed, as long as the intermediate anneal is performed at greater than 100° C.

Figure 14:
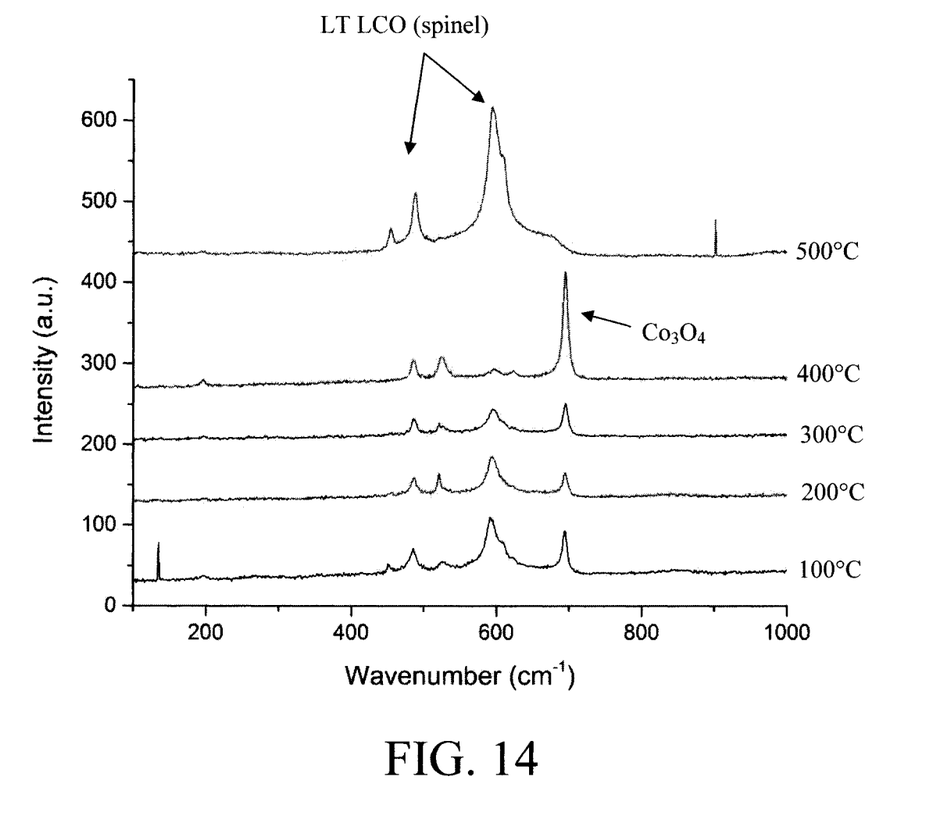
FIG. 14 is a spectra of comparative samples whereby gold was substituted for the platinum catalyst and layered HT phase LCO was not formed according to an embodiment of the present invention.

As another point of comparison, the same process was carried out except that the platinum catalyst was swapped out for gold. See FIG. 14. The same intermediate anneals were performed (i.e., at 100° C., 200° C., 300° C., 400° C., and 500° C.) followed by final anneal at 500° C. (for a duration of about 1 hour to about 10 hours, with a ramp-up rate of from about 1° C./minute to about 10° C./minute). In this case, however, the result was that layered HT phase LCO was not formed in any of the samples. This example illustrates the efficacy of platinum as a catalyst for layered HT phase LCO synthesis.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of synthesizing layered high temperature (HT) phase lithium cobalt oxide (LCO), the method comprising:
    depositing a diffusion barrier layer on a substrate;
    depositing an adhesion layer on the diffusion barrier layer, wherein the adhesion layer comprises a metal selected from the group consisting of: chromium, nickel, and combinations thereof, and wherein the diffusion barrier layer comprises an oxide material selected from the group consisting of: silicon oxide, aluminum oxide, and combinations thereof;
    forming a metal catalyst layer on the adhesion layer;
    depositing LCO onto the metal catalyst layer from a solution comprising LCO precursors dissolved in a solvent using a sol-gel process; and
    annealing the LCO under conditions sufficient to form the layered HT phase LCO on the metal catalyst layer, wherein a single deposition of the LCO from the solution does not apply enough of the solution to the metal catalyst layer to produce the LCO having a desired thickness, and wherein the depositing further comprises: performing multiple depositions of the solution, with ex-situ intermediate anneals after each of the multiple depositions until the LCO has reached the desired thickness and, following a last of the multiple depositions, the annealing is performed to form the layered HT phase LCO, wherein the method further comprises:
    preparing the solution comprising the LCO precursors dissolved in the solvent, wherein the solvent comprises methoxyethanol, wherein the LCO precursors comprise lithium ethoxide and cobalt(II) 2-methoxyethoxide, and wherein the preparing of the solution comprises adding 40% molar excess of the lithium ethoxide to 5% weight by volume of the cobalt(II) 2-methoxyethoxide in the methoxyethanol;
    drawing the solution in an air free environment comprising inert nitrogen gas with below 1 part per million $H_2O$ and 1 part per million $O_2$; and
    casting the solution drawn onto the metal catalyst layer.

2. The method of claim 1, wherein the metal catalyst layer comprises platinum.

3. The method of claim 1, wherein the metal catalyst layer has a thickness of from about 50 nm to about 100 nm.

4. The method of claim 1, wherein the conditions comprise a temperature of from about 500° C. to about 600° C.

5. The method of claim 1, wherein the conditions comprise a duration of less than or equal to about 30 minutes.

6. The method of claim 1, wherein the adhesion layer has a thickness of from about 5 nm to about 10 nm.

7. The method of claim 1, further comprising:
    depositing a first layer of the LCO onto the metal catalyst layer from the solution;
    performing an intermediate anneal of the first layer of the LCO; and
    depositing at least one second layer of the LCO onto the first layer of the LCO from the solution.

8. The method of claim 7, wherein the intermediate anneal is performed at a temperature of from about 200° C. to about 500° C., for a duration of from about 1 minute to about 25 minutes.

9. The method of claim 1, further comprising:
    depositing an electrolyte on the layered HT phase LCO, wherein the layered HT phase LCO comprises a cathode; and
    depositing an anode on the electrolyte.

10. The method of claim 9, wherein the electrolyte comprises amorphous lithium lanthanum titanate.

11. The method of claim 9, wherein the anode comprises a material selected from the group consisting of: vanadium oxide, graphite, carbon nanotubes, carbon nanofibers, silicon, germanium, tin, nickel, a transition metal oxide, and combinations thereof.

12. The method of claim 1, wherein the annealing is performed with a ramp-up rate of from about 1° C./minute to about 10° C./minute.

* * * * *